Feb. 26, 1963

J. L. WOLFE 3,078,743

EXPANSIBLE CHAMFERING ATTACHMENT
FOR A ROTATABLE REAMER

Filed Nov. 3, 1961

John L. Wolfe
INVENTOR.

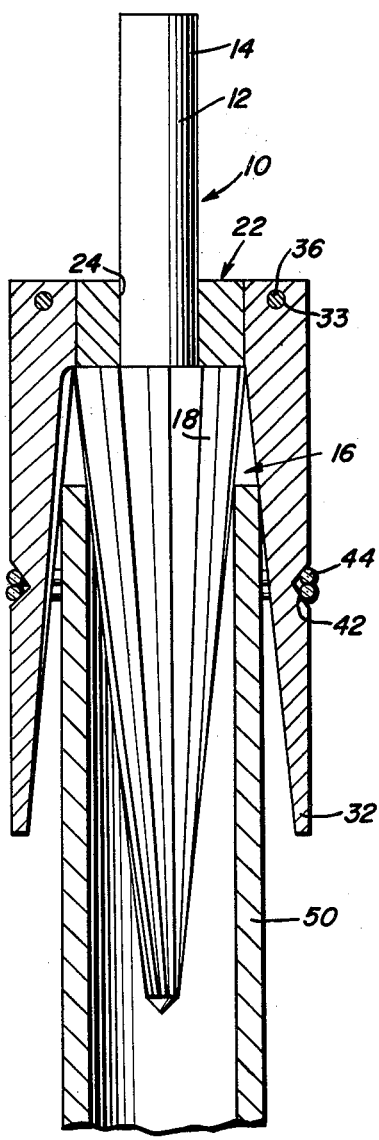
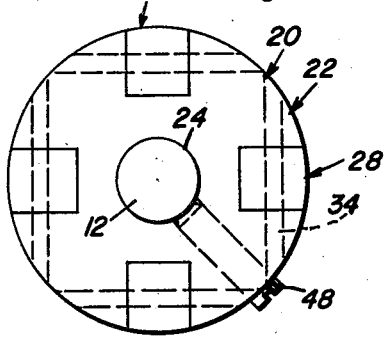
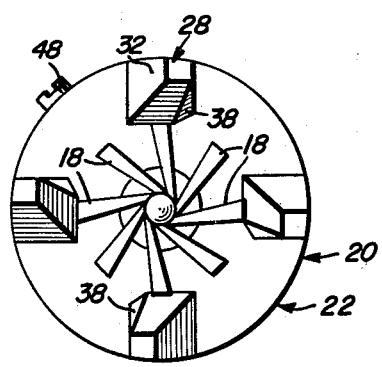

United States Patent Office 3,078,743
Patented Feb. 26, 1963

3,078,743
EXPANSIBLE CHAMFERING ATTACHMENT FOR A ROTATABLE REAMER
John L. Wolfe, 3328 Elizabeth St., Pueblo, Colo.
Filed Nov. 3, 1961, Ser. No. 150,055
8 Claims. (Cl. 77—73)

This invention relates to a novel and useful expansible chamfering attachment for a pipe reamer of the type including an elongated shank having one end portion adapted to be gripped by a rotatable chuck and a reamer body on the other end.

Conventionally, the pipe reamer for which the chamfering attachment of the instant invention is to be used is provided with a cone-shaped reamer body and the reamer body comprises a plurality of generally radially outwardly projecting blade portions.

In some instances it is highly desirable to chamfer the end of a pipe section while simultaneously reaming the internal surfaces of that end of the pipe section. Accordingly, the main object of this invention is to provide an expansible chamfering attachment for a conventional type of pipe reamer such as that set forth above which may be secured to the pipe reamer and utilized simultaneously with the pipe reamer to chamfer the outer surfaces of the end of a pipe section while the inner surfaces thereof are being reamed by means of the pipe reamer.

A further object of this invention, in accordance with the preceding object, is to provide an expansible chamfering attachment which will readily adapt itself to pipe sections of varying diameters.

Still another object of this invention is to provide a chamfering attachment which may be readily secured to a conventional type of pipe reamer such as that set forth above.

A final object to be specifically enumerated herein is to provide a chamfering attachment in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 4 is an enlarged vertical sectional view of the chamfering attachment shown mounted on a conventional type of pipe reamer taken substantially upon a plane passing through the longitudinal center line of the pipe reamer;

FIGURE 5 is a top plan view of the embodiment illustrated in FIGURE 4 shown with the pipe section removed; and FIGURE 6 is a bottom plan view of the embodiment illustrated in FIGURE 4 shown with the pipe section removed.

Figure 1:
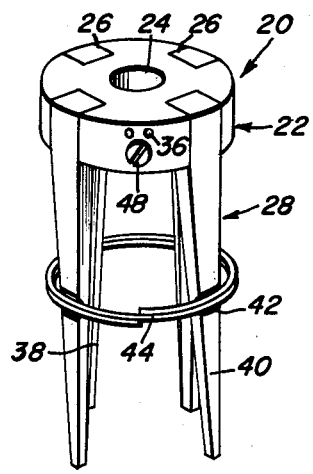
FIGURE 1 is a perspective view of the chamfering attachment.
Figure 2:
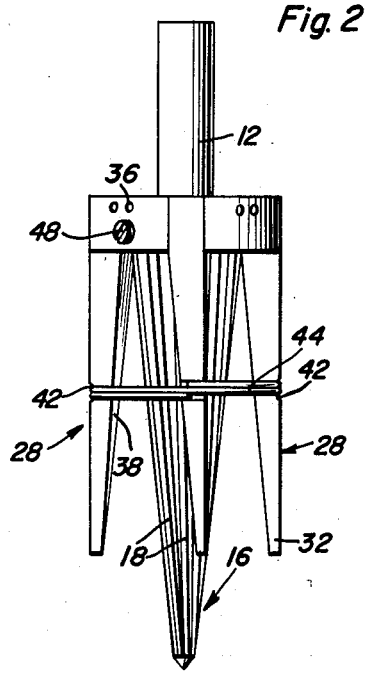
FIGURE 2 is a side elevational view of the chamfering attachment shown mounted on a conventional type of pipe reamer.

Referring now more specifically to the drawings and to FIGURE 4 in particular it will be seen a conventional form of pipe reamer generally referred to by the reference numeral 10 which includes an elongated shank portion 12 having one end portion 14 adapted to be gripped in a rotatable chuck and a cone-shaped reamer body generally referred to by the reference numeral 16 carried by the other end of the shank portion 12. The cone-shaped reamer body includes a plurality of generally radially outwardly projecting teeth 18 and inasmuch as the pipe reamer 10 is of conventional design further explanation as to its structural features and manner of operation is deemed to be unnecessary.

Figure 3:
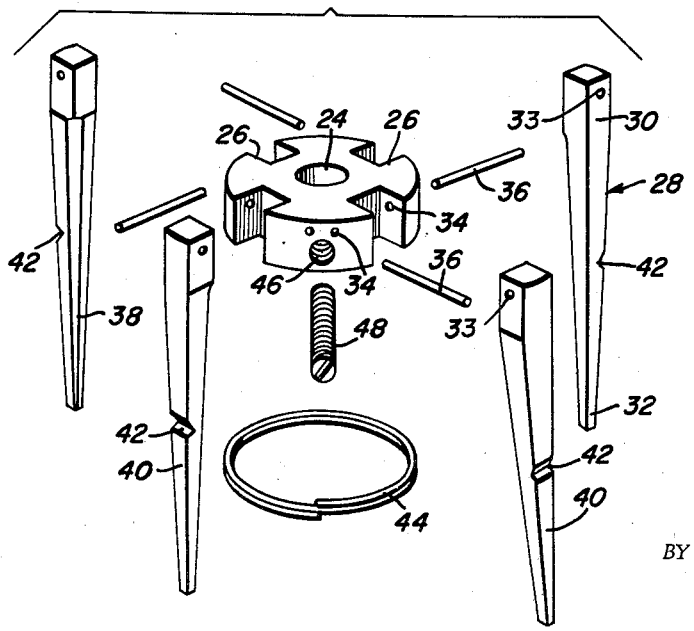
FIGURE 3 is an exploded perspective view of the chamfering attachment.

Referring now to FIGURE 1 of the drawings it will be seen that the chamfering attachment of the instant invention which is generally designated by the reference numeral 20 includes a generally disk-shaped body member generally referred to by the reference numeral 22 and which is provided with a centrally disposed bore 24. The outer periphery of the body member 22 is provided with a plurality of circumferentially spaced and radially outwardly opening notches 26 as can best be seen in FIGURE 3 of the drawings and it will be noted that the chamfering attachment includes a plurality of arm members generally referred to by the reference numerals 28. Each of the arm members 28 includes a major end portion 30 and a minor end portion 32 and it will be noted that the major end portions 30 are each provided with a transverse bore 33. Additionally, the portions of the disk 22 disposed on opposite sides of each of the notches 26 are provided with aligned bores 34 with which the corresponding bore 33 is registrable. A pivot pin 36 is passed through each pair of bores 34 and the corresponding bore 33 to pivotally secure the corresponding arm member 28 in one of the notches 26. The inner sides of the arm members 28 are provided with cuttings edges 38 and it will be noted that the outer sides 40 of the arm members 28 are provided with outwardly opening notches 42. A circular retaining and expansion spring ring 44 encircles the free or minor end portions 32 of the arms 28 and yieldably urges the minor end portions 32 radially inwardly.

The disk 22 is provided with a threaded transverse bore 46 and a setscrew 48 is threadedly engaged therein. The inner end of the bore 46 communicates with the central bore 24 and accordingly, when the disk 22 is disposed on the shank portion 12 the setscrew 48 may be utilized to rigidly secure the disk 22 to the shank portion 12.

In operation, and with attention directed to FIGURE 4 of the drawings, it may be seen that the pipe reamer 10 may have its cone-shaped reamer body 16 inserted in one end of the pipe section 50 to ream the internal surfaces thereof. However, it will be noted that the arm members 28 of the chamfering attachment 20 are disposed in frictional engagement with the outer surfaces of the pipe section 50 and that the cutting edges 38 will chamfer the outer surfaces of the end of the pipe section 50 as the reamer body 16 is reaming the internal surfaces of the pipe section 50. If the pipe section 50 were smaller in diameter, the expansion ring 44 would resiliently urge the minor ends of the arm members 28 radially inwardly to ensure that the cutting surfaces 38 would be maintained in cutting engagement with that pipe section and if the pipe section 50 were of a larger diameter, the expansion ring 44 would allow the free ends of the arm members 28 to be swung radially outwardly beyond that position illustrated in FIGURE 4 to accommodate the larger diameter pipe section.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:
1. In combination with a pipe reamer of the type in- cluding an elongated shank having one end portion adapted to be gripped by a rotatable chuck and a reamer body on the other end adapted to ream the internal surfaces of a pipe section, an expansible chamfering attachment comprising a disk-shaped body member having a bore formed therethrough through which said shank is received with said body member disposed adjacent said reamer body, said body member including means removably securing said body member to said shank, a plurality of elongated arm members, means pivotally securing corresponding ends of said arm members to said body member about axes extending transversely of said bore and arm members with the free ends of said arm members extending longitudinally of said shank disposed about said reamer body and mounted for generally radial movement relative to said reamer body, the confronting sides of said arm members including cutting edges adapted to chamfer the outer surfaces of the end of a pipe or the like into which said reamer body is inserted, means supported solely from said arm members and yieldingly urging the free ends of said arm members radially inwardly.

2. The combination of claim 1 wherein the outer remote faces of the free end portions of said arm members have outwardly opening notches formed therein, said urging means comprising a generally circular expansion spring encircling the free end portions of said arms and seated in said notches.

3. The combination of claim 1 wherein said urging means includes spring means secured between the free end portions of said arm members.

4. The combination of claim 1 wherein said securing means comprises a centrally disposed opening formed in said body member, said shank being received through said opening, means carried by said body member and rigidly securing said body member to said shank for rotation therewith.

5. The combination of claim 4 wherein said urging means includes spring means secured between the free end portions of said arm members.

6. The combination of claim 1 wherein said securing means comprises a centrally disposed opening formed in said body member, said shank being received through said opening, means carried by said body member and rigidly securing said body member to said shank for rotation therewith, said opening comprising a bore, said securing means carried by said body member comprising a setscrew threadedly engaged in a transverse bore in said body communicating with the first-mentioned bore at its inner end.

7. The combination of claim 1 wherein said securing means comprises a centrally disposed opening formed in said body member, said shank being received through said opening, means carried by said body member and rigidly securing said body member to said shank for rotation therewith, said body member comprising a generally centrally apertured disk member, a plurality of radially outwardly opening notches formed in said disk member and circumferentially spaced about said disk, said corresponding ends of said arm members being disposed in said notches.

8. The combination of claim 7 wherein the outer remote faces of the free end portions of said arm members have outwardly opening notches formed therein, said urging means comprising a generally circular expansion spring encircling the free end portions of said arms and seated in said notches.

References Cited in the file of this patent

UNITED STATES PATENTS

| | | |
|---|---|---|
| 1,122,315 | Schoengarth et al. | Dec. 29, 1914 |
| 1,680,372 | Fenn | Aug. 14, 1928 |
| 2,204,516 | Stone | June 11, 1940 |